United States Patent [19]
Enjeti et al.

[11] Patent Number: 6,005,362
[45] Date of Patent: Dec. 21, 1999

[54] METHOD AND SYSTEM FOR RIDE-THROUGH OF AN ADJUSTABLE SPEED DRIVE FOR VOLTAGE SAGS AND SHORT-TERM POWER INTERRUPTION

[75] Inventors: Prasad N. Enjeti; Jose L. Duran-Gomez, both of College Station, Tex.

[73] Assignee: The Texas A&M University Systems, College Station, Tex.

[21] Appl. No.: 09/248,769

[22] Filed: Feb. 12, 1999

Related U.S. Application Data

[60] Provisional application No. 60/074,719, Feb. 13, 1998.

[51] Int. Cl.$^6$ .............................. G05F 5/08; H02M 5/44
[52] U.S. Cl. ........................ 318/479; 318/375; 318/380; 363/37; 363/50; 363/74
[58] Field of Search ................................... 318/459, 478, 318/479, 375, 379, 380; 307/43, 44, 45; 363/34, 35, 37, 50, 74; 323/299

[56] References Cited

U.S. PATENT DOCUMENTS

| | | | |
|---|---|---|---|
| 4,811,190 | 3/1989 | Keir et al. | 363/60 |
| 4,814,966 | 3/1989 | Ekstrand | 363/89 |
| 5,513,088 | 4/1996 | Williamson | 363/20 |
| 5,754,419 | 5/1998 | Ho | 363/89 |

FOREIGN PATENT DOCUMENTS 8801450  2/1988  WIPO .

OTHER PUBLICATIONS

H. Mao, et al. "High Performance Three–Phase Power Factor Correction Circuits", IEEE, vol. 1, Nov. 1995, pp. 8–14.

A. van Zyl, et al. "Voltage Sag Ride–Through for Adjustable Speed Drives with Active Rectifiers", IEEE, vol. 1, Oct. 1997, pp. 486–492.

A.R. Prasad, et al., "An Active Power Factor Correction Technique for Three–Phase Diode Rectifiers", IEEE Transactions on Power Electronics, vol. 6, No. 1, Jan. 1991, pp. 83–92.

*Primary Examiner*—Bentsu Ro
*Attorney, Agent, or Firm*—Baker & Botts, L.L.P.

[57] ABSTRACT

In one embodiment of the present invention, a system for ride-through of an adjustable speed drive for voltage sags is provided. The system comprises an adjustable speed drive including a three phase electric utility, a diode rectifier, a dc-link, an inverter, and a motor. Coupled to the adjustable speed drive is a ride-through circuit which includes a controller having a first input and a second input, the first input operable to receive the voltage from each phase of the three phase electric utility and determine the magnitude and phase of the voltage sag, and the second input operable to receive the dc-link voltage to ensure that the rated dc-link voltage is not exceeded. Also included is an IGBT coupled to an output of the controller and operable to switch on and off rapidly based on the amount of voltage sag. An inductor associated with the IGBT and operable to store energy when the IGBT is switched on and to transfer energy to the dc-link when the IGBT is off is also included. This maintains the dc-link voltage to provide ride-through operation of the adjustable speed drive.

24 Claims, 5 Drawing Sheets

METHOD AND SYSTEM FOR RIDE-THROUGH OF AN ADJUSTABLE SPEED DRIVE FOR VOLTAGE SAGS AND SHORT-TERM POWER INTERRUPTION

RELATED APPLICATIONS

This application claims the benefit of Ser. No. 60/074,719, entitled "Method And System For An Adjustable Speed Drive System Under Voltage Sags And Short-Term Power Interruptions", filed provisionally on Feb. 13, 1998.

TECHNICAL FIELD OF THE INVENTION

This invention relates in general to the field of electronic systems and, more particularly, to a method and system for ride-through of an adjustable speed drive for voltage sags and short-term power interruptions.

BACKGROUND OF THE INVENTION

A voltage sag, or voltage dip is a reduction of the voltage at a customer position with a duration of between one cycle and a few seconds. Voltage sags are caused by motor starting, short circuits and fast re-closing of circuit breakers. Voltage sags normally do not cause equipment damage but can easily disrupt the operation of sensitive loads such as electronic adjustable speed drives (ASDs). A severe voltage sag can be defined as one that falls below 85% of rated voltage. Power quality surveys are a common practice and frequently appear in the literature. According to these surveys, voltage sags are the main cause of disturbances. For example, in one survey, 68% of the disturbances registered were voltage sags, and these sags were the only cause of production loss. This loss was caused by voltage drops of more than 13% of rated voltage and a duration of more than 8.3 ms (½ cycle). A recent study conducted at two industrial sites with adjustable speed drives concluded that voltage sags with a duration of 12 cycles or more and lower than 20% voltage drop will trip out the adjustable speed drive (either over-current or under-voltage trip) involved in a continuous process. Modern adjustable speed drives appear to be more sensitive than data processing equipment to voltage sags.

For example, in textile and paper mills a brief voltage sag may potentially cause an adjustable speed drive to introduce speed fluctuations that can damage the end product. Further, a brief voltage sag also causes a momentary decrease in dc-link voltage triggering an under voltage trip or result in an over current trip. Such nuisance tripping of adjustable speed drive equipment employed in continuous-process industries contributes to loss in revenue and can incur other costs.

Currently, there are boost system which are designed to maintain the dc-link voltage under voltage sags. These methods however, introduce diodes that are in the series path of power flow They also include an inductor that is bulky and is in the series path of power flow. Having the diodes and inductor in the series path of the main power flow is disadvantageous because it causes power to dissipate and can become a reliability problem if those components were to fail, since they are in series with the main power flow. Also, the inductor has to be large because it carries power at all times. Additionally, the inductor in this design carries high frequency current during the boost mode when voltage sags occur.

Other methods to provide ride-through including adding motor generator sets, adding flywheel energy storage and using super conductor magnetic energy storage (SMES). These methods are prohibitively expensive.

SUMMARY OF THE INVENTION

Accordingly, it may be appreciated that a need has arisen for method and system for ride-through of an adjustable speed drive for voltage sags and short-term power interruptions. In accordance with the teachings of the current invention, method and system for ride-through of an adjustable speed drive for voltage sags and short-term power interruptions is provided which substantially eliminates or reduces the disadvantages of previous methods.

In one embodiment of the present invention, an adjustable speed drive system operable to continuously operate in a voltage sag is provided. The system comprises an adjustable speed drive including a three phase electric utility, a diode rectifier, a dc-link, an inverter, and a motor. Coupled to the adjustable speed drive is a ride-through circuit which includes a controller having a first input and a second input, the first input operable to receive the voltage from each phase of the three phase electric utility and determine the magnitude and phase of the voltage sag, and the second input operable to receive the dc-link voltage to ensure that the rated dc-link voltage is not exceeded. Also included is an IGBT coupled to an output of the controller and operable to switch on and off rapidly based on the amount of voltage sag. An inductor associated with the IGBT and operable to store energy when the IGBT is switched on and to transfer energy to the dc-link when the IGBT is off is also included. This maintains the dc-link voltage to continuously operate the adjustable speed drive.

The present invention provides various technical advantages over current methods. For example, the new system is a low cost, due to minimal additional hardware and control. Also, no power semiconductor components are in the main power flow path of the adjustable speed drive. Additionally, the proposed modification can be easily integrated into a standard adjustable speed drive. Other technical advantages may be readily apparent to one skilled in the art and from the following descriptions, figures and claims.

BRIEF DESCRIPTION OF THE DRAWINGS

For a more complete understanding of the advantages of the present invention and advantages thereof, reference is now made to the following descriptions taken in conjunction with the accompanying drawings, in which like numerals represent like parts, in which.

DETAILED DESCRIPTION OF THE INVENTION

Embodiments of the present invention and its advantages are best understood by referring to FIGS. 1 through 6 of the drawings, like numerals being used for like and corresponding parts of the various drawings.

Figure 1:
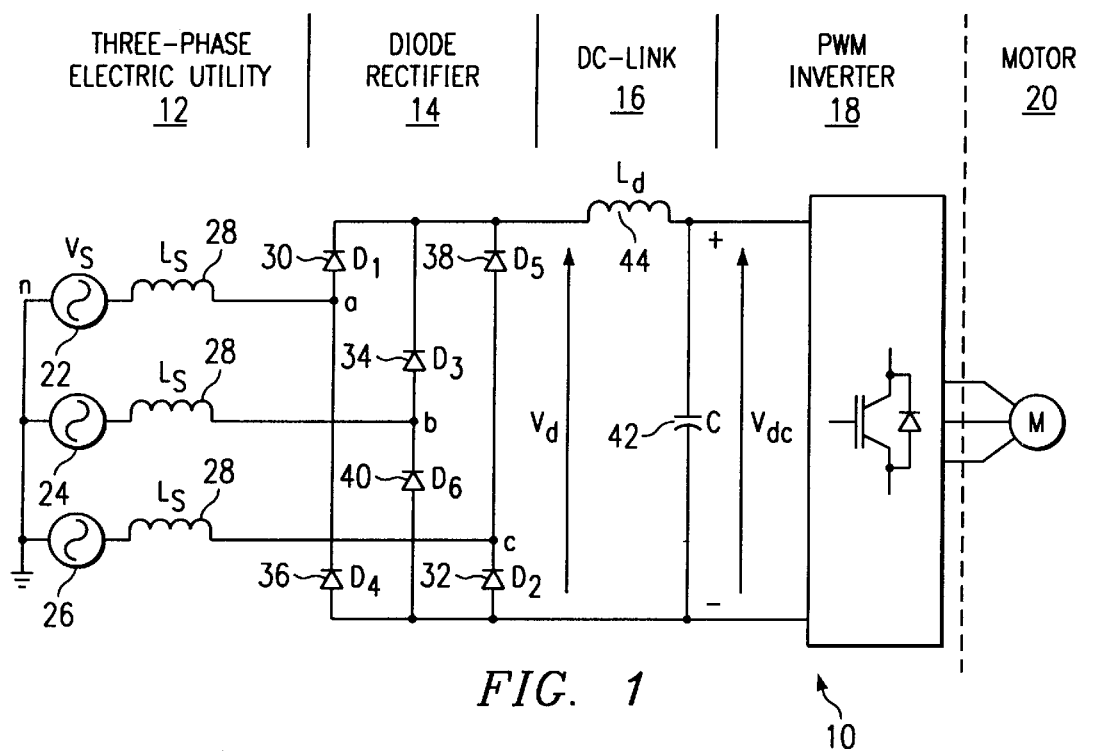
FIG. 1 illustrates an adjustable speed drive (ASD)

FIG. 1 illustrates an adjustable speed drive (ASD) 10 which consists of a three-phase electric utility 12, a diode rectifier 14, a dc-link 16 and an inverter 18 coupled to a motor 20. Three-phase electric utility 12 consists of three utility phase voltages $V_{an}$ 22, $V_{bn}$ 24, and $V_{cn}$ 26. Associated with each phase voltage is a source impedance Ls 28. Diode rectifier 14 consists of a series of diodes for each utility phase voltage. In this case there are a total of six diodes in the diode rectifier 14 including $D_1$ 30, $D_2$ 32, $D_3$ 34, $D_4$ 36, $D_5$ 38, and $D_6$ 40. DC-link 16 consists of at least one dc-link capacitor 42 and optionally a dc-link inductor $L_d$ 44. This is coupled to inverter 18, which is then coupled to motor 20.

A voltage sag typically occurs in one phase of the three-phase system. In the following example it will be assumed that the voltage sag is at the c phase. When this occurs, rectifier diodes $D_5$ 38 and $D_2$ 32 cease to conduct and the line current in phase c of the rectifier collapses to zero. This occurs because a reduction in the voltage of the line to neutral, $V_{LN}$, begins to sag which causes $D_5$ 38 and $D_2$ 34 to be reverse biased. This causes the three-phase rectifier to become single phase. This state continues for the entire duration of the voltage sag on phase c. The fact that a voltage sag causes a three-phase system to become a single-phase system is independent of the magnitude of the voltage sag. This is due primarily to the non-linear operation of the rectifier. When the sag event occurs power to the motor may decrease. Also the voltage sag will cause the dc-link voltage to drop, possibly causing an under voltage trip. Finally, the current in the system may get too high causing an over current trip. Thus the goal is to find a way to eliminate the fluctuation in DC voltage to allow for a system to ride-through a voltage sags.

Figure 2:
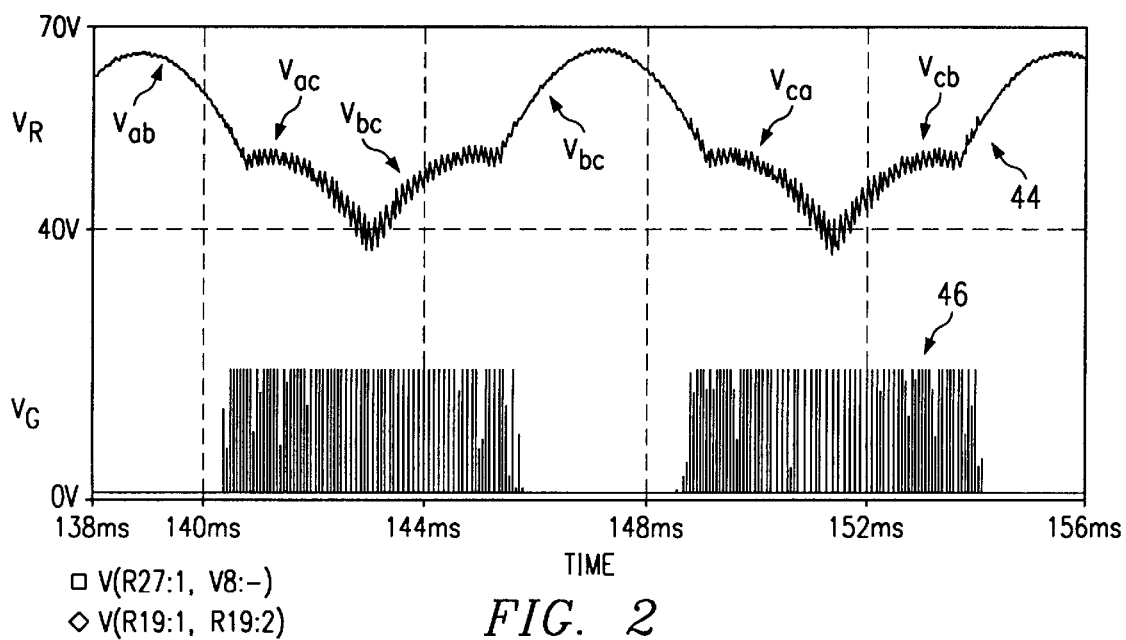
FIG. 2 is a graph of the rectified voltage under a voltage sag and a graph of the gate voltage of the IGBT.

FIG. 2 is a graph of the rectified voltage under a voltage sag. Graph 44 is drawn assuming a sag occurring in phase c. Graph 44 shows the rectified voltage output, with the voltage for each phase combination in a normal six-pulse operation mode filled in. The modes associated with phase c can be seen to deviate from normal. This indicates that the problem in an adjustable speed drive system occurs in the voltages in combination with the phase that sags.

Figure 3:
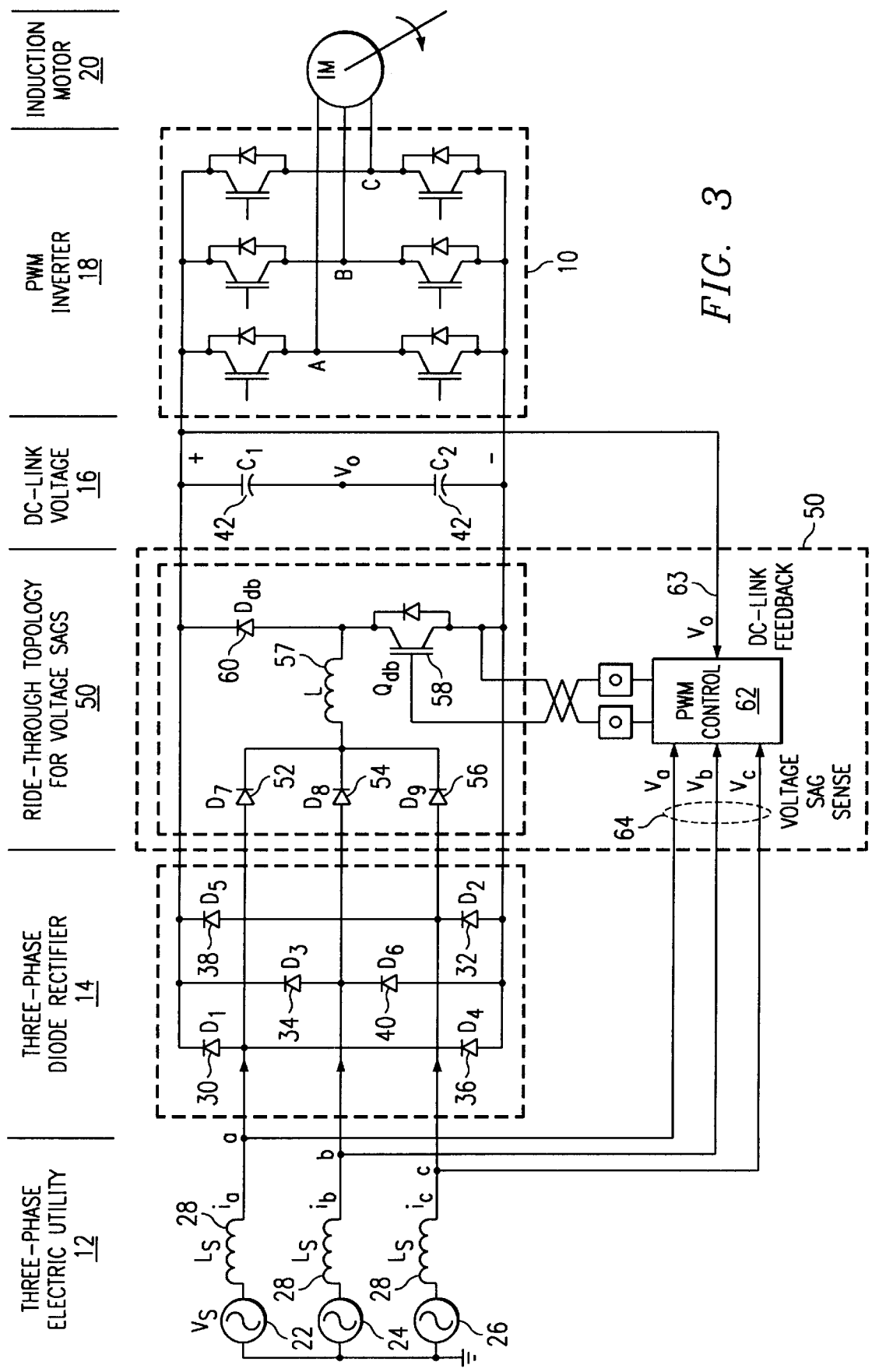
FIG. 3 is an illustration of an adjustable speed drive system with the addition of integrated ride-through circuit in accordance with the teaching of the present invention.

FIG. 3 is an illustration of an adjustable speed drive system 10 with the addition of integrated ride-through circuit 50 in accordance with the teaching of the present invention. Illustrated is adjustable speed drive system 10 with ride-through circuit 50 attached. Ride-through circuit 50 comprises a series of ride-through diodes, $D_7$ 52, $D_8$ 54, and $D_9$ 56, a ride-through inductor 57 as well as insulted gate bipolar transistor (IGBT), $Q_{DB}$ 58 and its associate IGBT diode $D_{DB}$ 60. A control unit 62 is connected between the $Q_{DB}$ 58, dc-link 16 and voltage source 12. $Q_{DB}$ 58 and $D_{DB}$ 60 are typically provided in an adjustable speed drive as part of the dynamic braking control. The dynamic braking control allows for rapid stopping of the motor in an adjustable speed drive by feeding back energy through inverter 18 and dissipating the energy in the dynamic braking resistor 102.

Again assuming a sag at phase c, in operation when a voltage sag is detected by control unit 62, it will cause $Q_{DB}$ 58 to turn on and off rapidly. When $Q_{DB}$ 58 is on, a path exists for current to flow through $D_2$ 34 and $D_9$ 56, which causes energy to be stored in ride-through inductor 57. In this design, the diodes are not in series with the main power flow, nor is ride-through inductor 57. When $Q_{DB}$ 58 cycles off the energy from ride-through inductor 57 is transferred to dc-link capacitor 42 in dc-link 16. Then, dc-link capacitor 42 is able to maintain the voltage in dc-link 16.

Control unit 62 is operable to sense the voltage from all three of the voltage phases to determine the amount of sag and the phase of the sag. Once a voltage sag is detected, control unit 62 is operable to switch $Q_{DB}$ 58 on and off rapidly in order to charge dc-link capacitor 42 in dc-link 16. As noted in FIG. 2, only in four of the six possible pulse operation modes does the voltage drop below the rated value. Each of those modes corresponds to a voltage phase combination with the phase that is sagging. Thus, considering FIG. 2, $V_{bc}$, $V_{cb}$, $V_{ac}$, and $V_{ca}$, are the four voltage phases that deviate from normal. It is at this time when that sag is detected by control unit 62 and $Q_{DB}$ 58 is turned on and off to supply energy to capacitor 42 and dc-link 16. Additionally, control unit 62 checks dc-link 16 voltage in order to ensure that the dc-link 16 voltage does not get boosted beyond its normal rated value.

Figure 4:
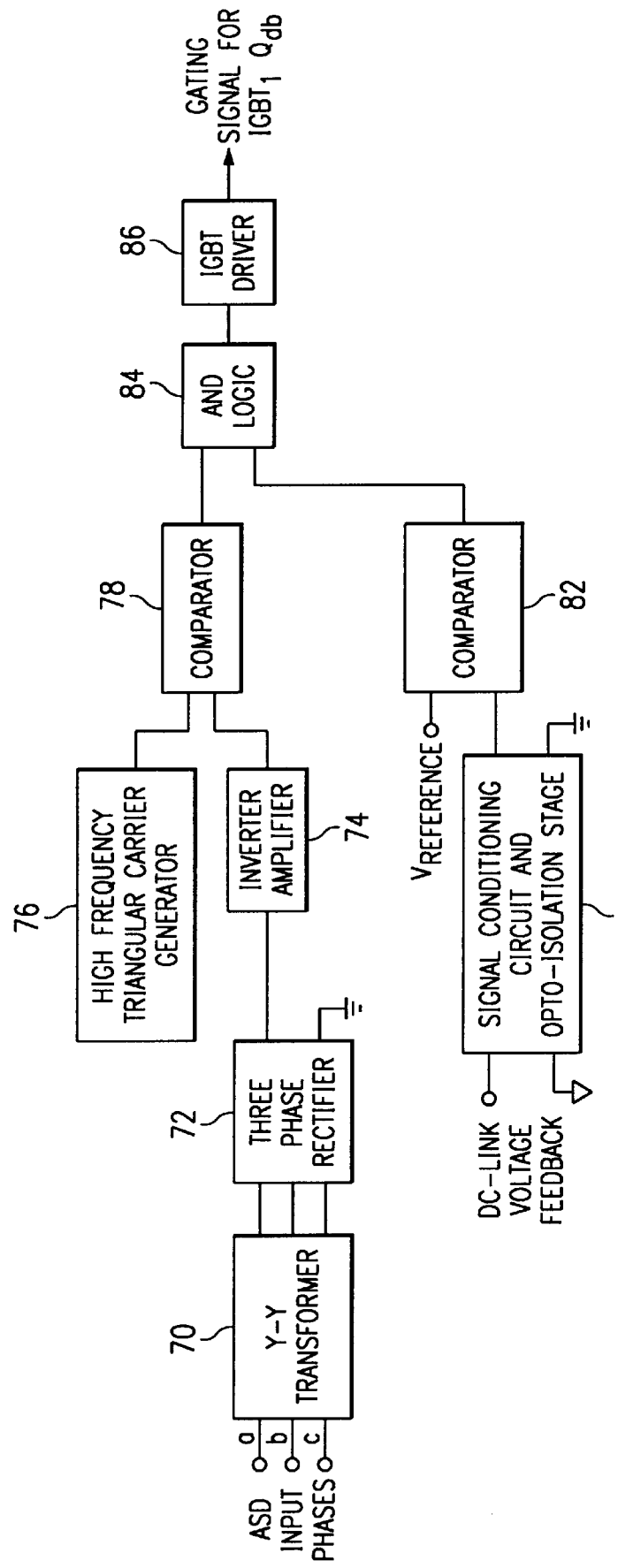
FIG. 4 illustrates a block diagram for the operation of control unit 62 in accordance with the teaching of the present invention.

FIG. 4 illustrates a block diagram for the operation of control unit 62 in accordance with the teaching of the present invention. Input phase lines 63 are provided as an input to a Y—Y transformer 70. Transformer 70 is operable to isolate the high level voltage from the voltage source and produce a signal level voltage. That output is feed to a three-phase rectifier 72 which will rectify the voltage to a value $V_R$, which is the same as the rectified voltage produced by three-phase diode rectifier 14 of adjustable speed drive 10. The larger the sag, the smaller the rectified voltage, $V_R$. The rectified voltages then passes to an inverter amplifier 74 which is operable to increase the rectified voltage and invert its value such that the output of inverter amplifier is a negative voltage at a higher absolute voltage value than the rectified voltage.

A high frequency triangular carrier generator 76 is provided as part of control unit 62. Carrier generator 76 is operable to generate a triangular waveform of varying frequency. The output of carrier generator 76 is inputted into one input of first comparator 78. The other input is the output of inverter amplifier 74. First comparator 78 is operable to compare the voltage of carrier generator 76 with the voltage output from inverter amplifier 74. If the voltage from carrier generator 76 is higher than the voltage from inverter amplifier 74 than a high positive voltage signal (or high signal) is outputted from first comparator 78. If the other case is true, if the output of inverter amplifier 74 is greater than the output of carrier generator 76 first comparator 78 will output a maximum negative voltage (or low signal). Since the output of carrier generator 76 is a triangular waveform that takes on high and low values, when there is a voltage sag there will be times when the voltage output from carrier generator 76 is larger than the output of inverter amplifier 74 (which is base on the rectified voltage which is based on the amount of sag). And, when there is a voltage sag there will be times when the voltage value of carrier generator 76 will be lower than the output of inverter amplifier 74 resulting in first comparator 78 producing a low output. Since the triangular waveform of carrier generator 76 is being compared to a fixed output based on the rectified voltage, the output of first comparator 78 will be a duty cycle of high and low values with a fixed frequency when there is a sag. This duty cycle feeds into AND gate 84. If there is no voltage sag, the rectified voltage will always exceed the voltage from carrier generator 76 and a low signal will always be outputted to AND gate 84.

The other input of AND gate 84 is based on the voltage value of dc-link 16. Dc-link voltage value is provided to a signal conditioning circuit 80 to isolate a signal level voltage value. This value is compared to a generated dc reference voltage at second comparator 82. If the reference voltage is higher than the dc-link voltage, a high value is outputted from second comparator 82. If the dc-link voltage is greater, a low value will be outputted to AND gate 84.

AND gate 84 compares the output of the two comparators. Because this is an AND gate, the output of AND gate 84 will be high only if both inputs are a high value. If the output of AND gate 84 is high than IGBT driver 86 will be on and the ride-through system will be activated. In the case of a voltage sag, the output of first comparator 78 will be high at certain points in the duty cycle and low at others. The output of second comparator 82 will always be high unless the dc-link voltage exceeds its rated value (in which case the output of second comparator 82 will go low and the output of AND gate 84 will always be low—this is to make sure the ride-through system does not boost the value of the dc-link over its rated value). Therefore, when voltage sag occurs, a duty cycle of fixed frequency will be outputted, consisting of high and low values, alternating at a high, fixed frequency. This duty cycle will be ANDed with the high positive value from second comparator 82 (which is always high unless dc-link voltage exceeds a pre-set threshold). The output of AND gate 84 will thus be a duty cycle of high and low values that will be outputted to IGBT driver 86. When the duty cycle is high, IGBT driver 86 will be on. When the duty cycle is low, IGBT driver 86 will be off. Thus, in the case of a voltage sag, IGBT driver 86 will cycle on and off rapidly at a fixed frequency. In the case of no voltage sag, the output of first comparator is low. Since any value ANDed with a low value will give a low value, the output of AND gate 84 when there is no voltage sag will always be low. As a result, IGBT driver 86 will always be shut off.

Thus, IGBT driver 86 starts when the rectified voltage drops below a certain value. This can be seen be examining FIG. 2. In graph 44, when the rectified voltage drops in the four regions, the ride-through circuit should operate. This can be verified by examining graph 46 of FIG. 2 which shows the gate voltage ($V_g$) of the IGBT ($Q_{DB}$). The gate voltage is positive during the rectified voltage drop and showing a rapid on and off cycle that occurs as the rectified voltage is compared with the triangular wave. This indicates the ride-through circuit is operating.

Figure 5:
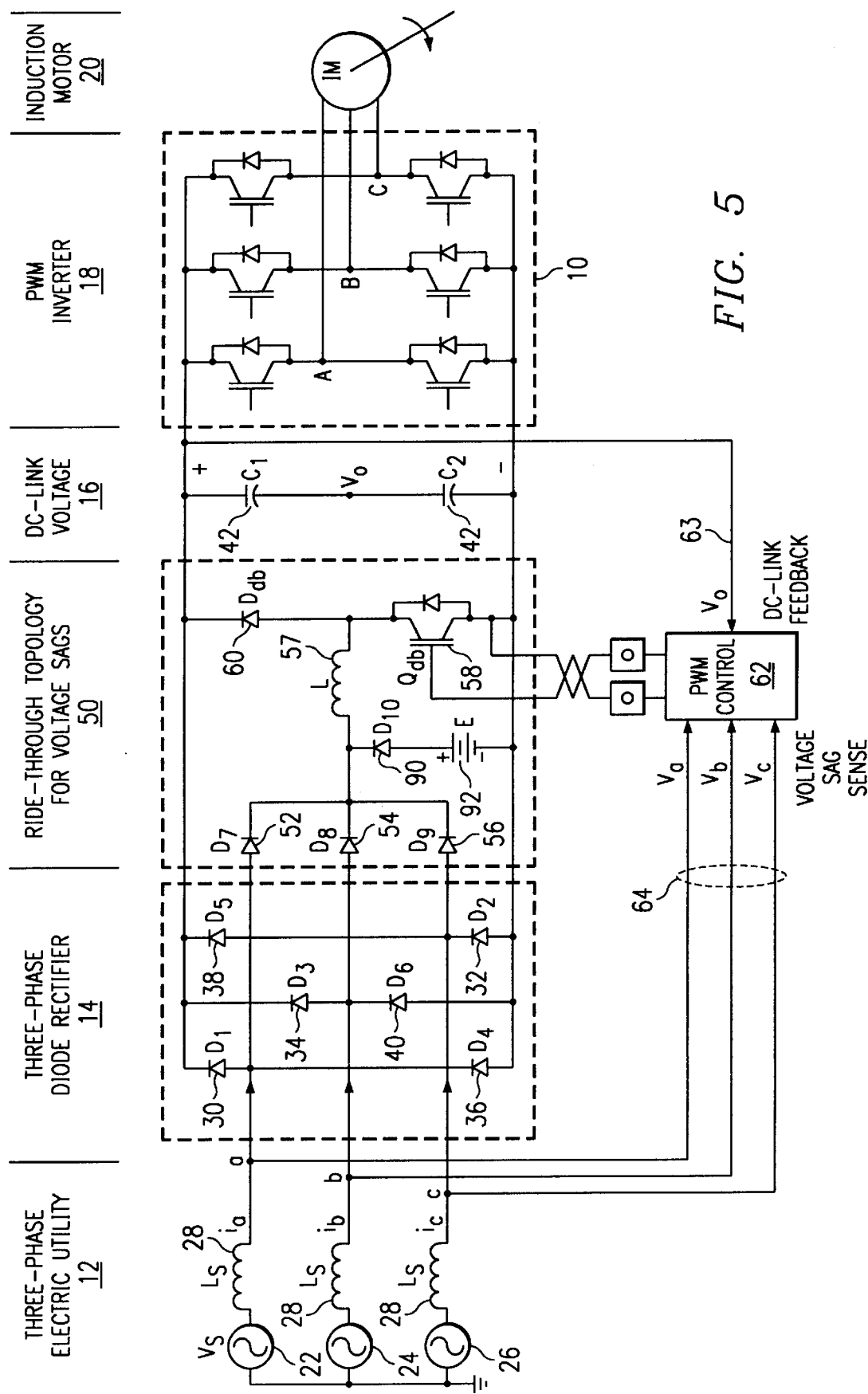
FIG. 5 illustrates an alternative embodiment of the present invention that provides for ride-through during short-term power interruptions; and, FIG. 6 illustrates an alternative embodiment of the present invention that provides for voltage sag ride-through as well as dynamic braking.

FIG. 5 illustrates an alternative embodiment of the present invention. FIG. 5 is the same as FIG. 3 with the addition of an energy source, E 92, as well as an additional energy source diode $D_{10}$ 90. Energy source, E 92, can be a super capacitor, battery, fuel cells, photovoltaic cells, flywheel and other equivalent sources of electric energy. In the event of a voltage sag, or even a complete loss of input power, energy source, E 92, can provide energy to inductor 57 and capacitor 42, thus maintaining the dc-link voltage value. This is accomplished by repeated turn-on/turn-off of the IGBT $Q_{DB}$ 58 by use of a control circuit similar to control unit 62 except that the comparison is between energy source, E 92, and high frequency triangular carrier generator 76.

Figure 6:
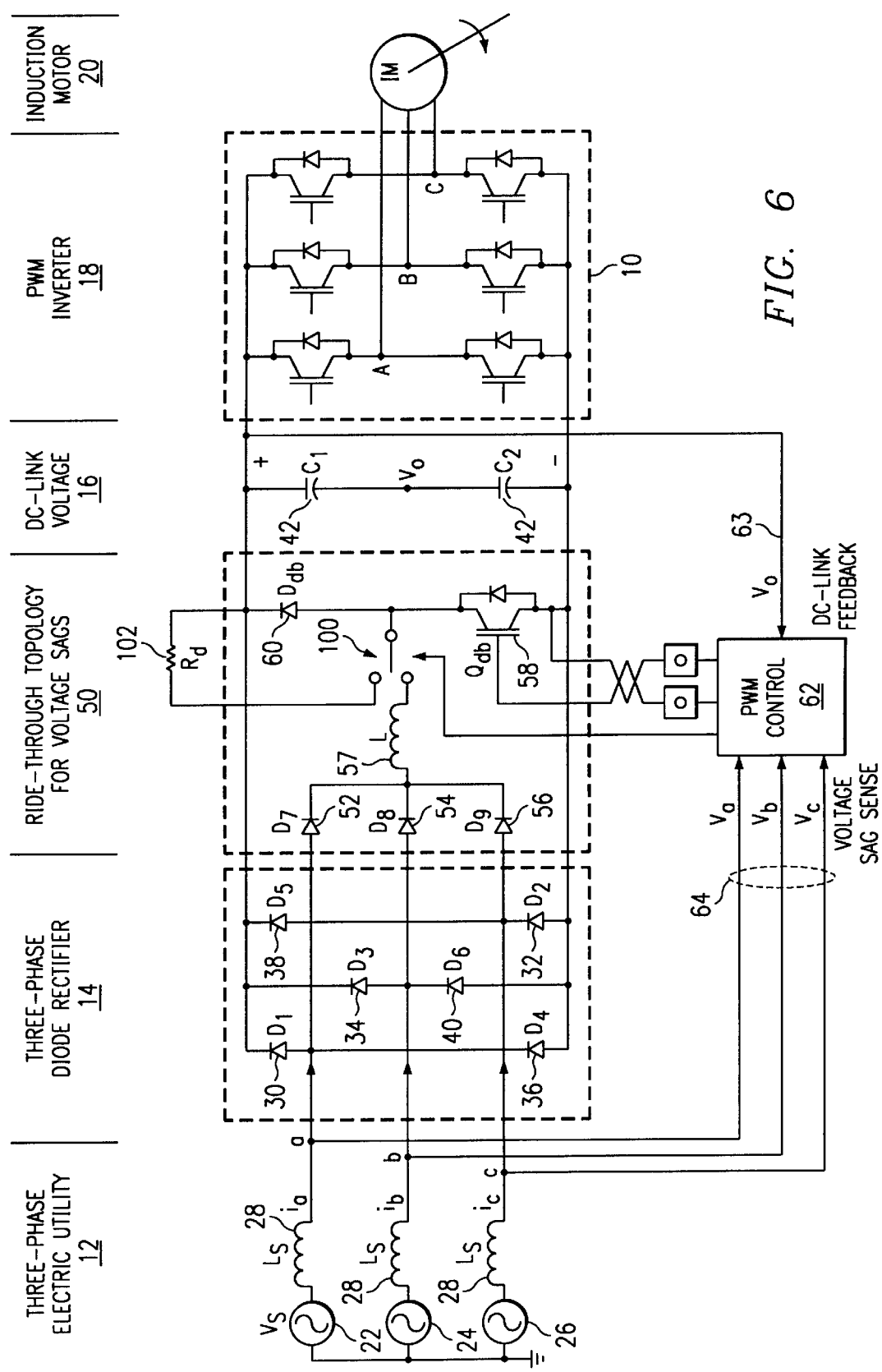

FIG. 6 illustrates an alternative embodiment of the present invention that provides for voltage sag ride-through as well as dynamic braking. As discussed earlier, an advantage of the present invention is that some of the components of the ride-through circuit are already in place in most adjustable speed drives as part of the dynamic braking circuit. The dynamic braking circuit can be seen in FIG. 6 as including $Q_{DB}$ 58, $D_{DB}$ 60, and resistor $R_d$ 102. A control circuit would also be included to trigger the dynamic braking circuit but is not pictured. When the dynamic braking circuit is operating, the energy in the motor is feed back via inverter 18 and dissipated in resistor $R_d$ 102.

The present invention modifies the existing adjustable speed drive by adding three diodes, an inductor and a control unit as discussed in FIG. 2. FIG. 6 illustrates the ride through circuit 50 of the present invention and the dynamic braking system connected by a relay 100. Normally, relay 100 is deployed to keep the ride-through circuit activated. Relay 100 then switches to activate the dynamic braking circuit when necessary.

Although the present invention has been described in detail, it should be understood that various changes, substitutions and alterations can be made thereto without departing from the scope and spirit of the present invention as defined by the appended claims.

What is claimed is:

1. An adjustable speed drive for ride-through of voltage sags comprising:
   an adjustable speed drive comprising:
      a three phase electric utility;
      a diode rectifier coupled to the three-phase utility;
      a dc-link coupled to the diode rectifier and having a dc-link capacitor;
      an inverter coupled to the dc-link;
      a motor coupled to the inverter; and
   a ride-through circuit coupled to the adjustable speed drive comprising:
      a control unit having a first input, the first input operable to receive the voltage from each phase of the three phase electric utility and determine if there is a voltage sag;
      an IGBT coupled to an output of the control unit and operable to switch on and off at variable duty cycle which is dependent on voltage sag and remain off if there is no voltage sag;
      ride-through diodes operable to be forward biased when the IGBT is on, one ride-through diode associated with each phase of the three phase electric utility;
      a ride-through inductor coupled to the ride-through diodes and associated with the IGBT, the ride-through inductor operable to store energy when the IGBT is switched on and to transfer energy to the dc-link capacitor when the IGBT is off in order to maintain the dc-link voltage to continuously operate the adjustable speed drive.

2. The adjustable speed drive of claim 1, further comprising an IGBT diode operable to be reversed biased when the IGBT is on to protect the dc-link capacitor from short circuit.

3. The adjustable speed drive of claim 2, wherein the IGBT and the IGBT diode are provided as part of a dynamic braking control.

4. The adjustable speed drive of claim 1, wherein the control unit has a second input coupled to the dc-link, the control unit operable to turn off the IGBT if the dc-link voltage exceeds a certain predetermined value.

5. The adjustable speed drive of claim 1, further comprising an energy source and an energy source diode operable to maintain the dc-link voltage under a short-term power interruption.

6. The adjustable speed drive of claim 5, wherein the energy source is one or more super capacitors.

7. The adjustable speed drive of claim 1, further including a dynamic braking control.

8. The adjustable speed drive of claim 1, further comprising a relay located between the ride-through circuit and the dynamic braking control to allow for use of either systems when necessary.

9. An apparatus to provide ride-through of a voltage sag in an adjustable speed drive comprising:

a controller operable to determine the voltage sag in a phase of a three phase electric utility;

an IGBT coupled to the controller and operable to shut down and turn on rapidly based on output of the controller;

ride-through diodes operable to be forward biased when the IGBT is on, one ride-through diode associated with each phase of the three phase electric utility;

a ride-through inductor coupled to the ride-through diodes and operable to store energy when IGBT is on; and a dc-link capacitor operable to receive and store energy from the inductor, the dc-link capacitor operable to keep a dc-link voltage near its rated value.

10. The apparatus of claim 9, further comprising an IGBT diode operable to be reversed biased when the IGBT is on to protect the dc-link capacitor from short circuit.

11. The apparatus of claim 10, wherein the IGBT and IGBT diode are provided as part of a dynamic braking control.

12. The apparatus of claim 9, wherein the controller is operable to turn off the IGBT if the dc-link voltage exceeds a certain predetermined value.

13. The apparatus of claim 9, further comprising an energy source and an energy source diode operable to maintain the dc-link voltage under a short-term interruption.

14. The apparatus of claim 13, wherein the energy source is one or more super capacitors.

15. The apparatus of claim 9, wherein the apparatus is connected to an adjustable speed drive.

16. The apparatus of claim 15, wherein the adjustable speed drive includes a dynamic braking control.

17. The apparatus of claim 16, further comprising a relay between the ride-through circuit and the dynamic braking control to allow for use of either systems when necessary.

18. A method for ride-through of an adjustable speed drive in a voltage sag comprising:

detecting a voltage sag at a control unit;

turning an IGBT on when a sag is detected and off if there is no sag using the control unit;

filling an inductor with energy when the IGBT is on;

transferring the energy to a capacitor in a dc-link when the IGBT is off; and maintaining the voltage in the dc-link.

19. The method of claim 18, wherein the IGBT is provided as part of a dynamic braking control.

20. The method of claim 18, wherein the step of maintaining the voltage in the dc-link further comprises the step of turning off the IGBT if the dc-link voltage exceeds a certain predetermined value.

21. The method of claim 18, further comprising an energy source and an energy source diode operable to maintain the dc-link voltage under a short-term power interruption.

22. The method of claim 21, wherein the energy source is one or more super capacitors.

23. The method of claim 18, wherein the adjustable speed drive includes a dynamic braking control.

24. The method of claim 23, further comprising a relay between the ride-through circuit and the dynamic braking control to allow for use of either systems when necessary.

* * * * *